United States Patent
Brickell et al.

(10) Patent No.: US 9,043,604 B2
(45) Date of Patent: May 26, 2015

(54) METHOD AND APPARATUS FOR KEY PROVISIONING OF HARDWARE DEVICES

(71) Applicant: Intel Corporation, Santa Clara, CA (US)

(72) Inventors: Ernest F. Brickell, Hillsboro, OR (US); Shay Gueron, Haifa (IL); Jiangtao Li, Beaverton, OR (US); Carlos V. Rozas, Portland, OR (US); Daniel Nemiroff, Folsom, CA (US); Vincent R. Scarlata, Beaverton, OR (US); Uday R. Savagaonkar, Beaverton, OR (US); Simon P. Johnson, Beaverton, OK (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/987,807

(22) Filed: Sep. 5, 2013

(65) Prior Publication Data

US 2014/0089659 A1 Mar. 27, 2014

Related U.S. Application Data

(63) Continuation of application No. 12/956,793, filed on Nov. 30, 2010, now abandoned.

(51) Int. Cl.
*H04L 9/08* (2006.01)
*H04L 9/32* (2006.01)
*G06F 21/73* (2013.01)
*G06F 21/60* (2013.01)

(52) U.S. Cl.
CPC .............. *H04L 9/0816* (2013.01); *G06F 21/73* (2013.01)

(58) Field of Classification Search
CPC ...... H04L 9/083; H04L 9/0816; H04L 9/0822; H04L 9/0866; H04L 9/0891; H04L 9/3242; G06F 21/73; G06F 21/606; G06F 2221/2129; G06F 2221/2153
USPC .......... 380/278, 279, 283, 284; 713/150, 151, 713/171
See application file for complete search history.

(56) References Cited

U.S. PATENT DOCUMENTS

| | | |
|---|---|---|
| 6,829,596 B1 | 12/2004 | Frazee |
| 7,353,388 B1 | 4/2008 | Gilman et al. |
| 8,205,080 B2 | 6/2012 | Calamera et al. |

(Continued)

FOREIGN PATENT DOCUMENTS

| | | |
|---|---|---|
| CN | 101699891 A | 4/2010 |
| JP | 2006-514321 A | 4/2006 |

(Continued)

OTHER PUBLICATIONS

Office Action received for Japanese Patent Application No. 2013-536941, mailed on Jun. 3, 2014, 5 page of English Translation and 4 pages of Japanese Office Action.

(Continued)

*Primary Examiner* — Joseph P Hirl
*Assistant Examiner* — Kalish Bell
(74) *Attorney, Agent, or Firm* — Lawrence Cho

(57) ABSTRACT

Keying materials used for providing security in a platform are securely provisioned both online and offline to devices in a remote platform. The secure provisioning of the keying materials is based on a revision of firmware installed in the platform.

10 Claims, 17 Drawing Sheets

(56) References Cited

U.S. PATENT DOCUMENTS

| | | |
|---|---|---|
| 2005/0022025 A1 | 1/2005 | Hug |
| 2008/0244698 A1 | 10/2008 | Takatsuji et al. |
| 2010/0134192 A1 | 6/2010 | Min et al. |
| 2011/0040933 A1* | 2/2011 | Swindell ........................ 711/104 |
| 2011/0091037 A1 | 4/2011 | Pinder |
| 2012/0137137 A1 | 5/2012 | Brickell et al. |
| 2012/0300939 A1 | 11/2012 | Du et al. |

FOREIGN PATENT DOCUMENTS

| | | |
|---|---|---|
| JP | 2009-545908 A | 12/2009 |
| JP | 2010-182070 A | 8/2010 |
| KR | 10-2006-0042262 A | 5/2006 |
| KR | 10-2009-0067194 A | 6/2009 |
| WO | 2004/070587 A1 | 8/2004 |
| WO | 2008/015603 A1 | 2/2008 |
| WO | 2010/116618 A1 | 10/2010 |
| WO | 2012/074720 A1 | 6/2012 |

OTHER PUBLICATIONS

Gueron, et al., "Where does security stand? New Vulnerabilities vs. Trusted Computing", IEEE MICRO, IEEE, vol. 27, Issue 6, Nov. 2007, pp. 25-35.

Shin Hitotsumatsu, "Study on Data Protection and Encryption", Nihon Keizai Shinbunsha, Japan, 1st edition, 1st print, Jul. 29, 1983, pp. 90-97.

NTT DoCoMo, "Trusted Mobile Platform Technology for Secure Terminals", NTT DoCoMo, vol. 7, No. 2, Jul. 1, 2005, pp. 25-29.

Menezes, et al., "Handbook of Applied Cryptography", CRC Press, 1996, pp. 794.

International Preliminary Report on Patentability and Written Opinion received for PCT Patent Application No. PCT/US2011/060345, mailed on Jun. 13, 2013, 7 Pages.

International Search Report and Written Opinion Received for PCT Patent Application No. PCT/US2011/060345, mailed on Apr. 19, 2012, 10 Pages.

* cited by examiner

METHOD AND APPARATUS FOR KEY PROVISIONING OF HARDWARE DEVICES

RELATED APPLICATION

This application is a continuation of and claims priority and benefit to U.S. application Ser. No. 12/956,793 filed on Nov. 30, 2010, entitled, "Method and Apparatus for Key Provisioning of Hardware Devices".

FIELD

This disclosure relates generally to the field of information processing and in particular to the field of security in computing systems and microprocessors.

BACKGROUND

Cryptographic algorithms and the protocols that use them require keys which are based upon random numbers. For example, such keys can be secret/shared keys used by symmetric key algorithms such as the Advanced Encryption Standard (AES) and the Data Encryption Standard (DES) used for block or stream encryption and public/private key pairs used by asymmetric key algorithms such as Riverst, Shamir, Adleman (RSA) and Digital Signal Algorithm (DSA).

A trusted platform module (TPM) is an integrated circuit (device) that conforms to the trusted platform module specification to enable trusted computing features. The manufacturer of the TPM provisions an asymmetric key to each TPM. This asymmetric key can be used for encryption and to obtain other keys.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
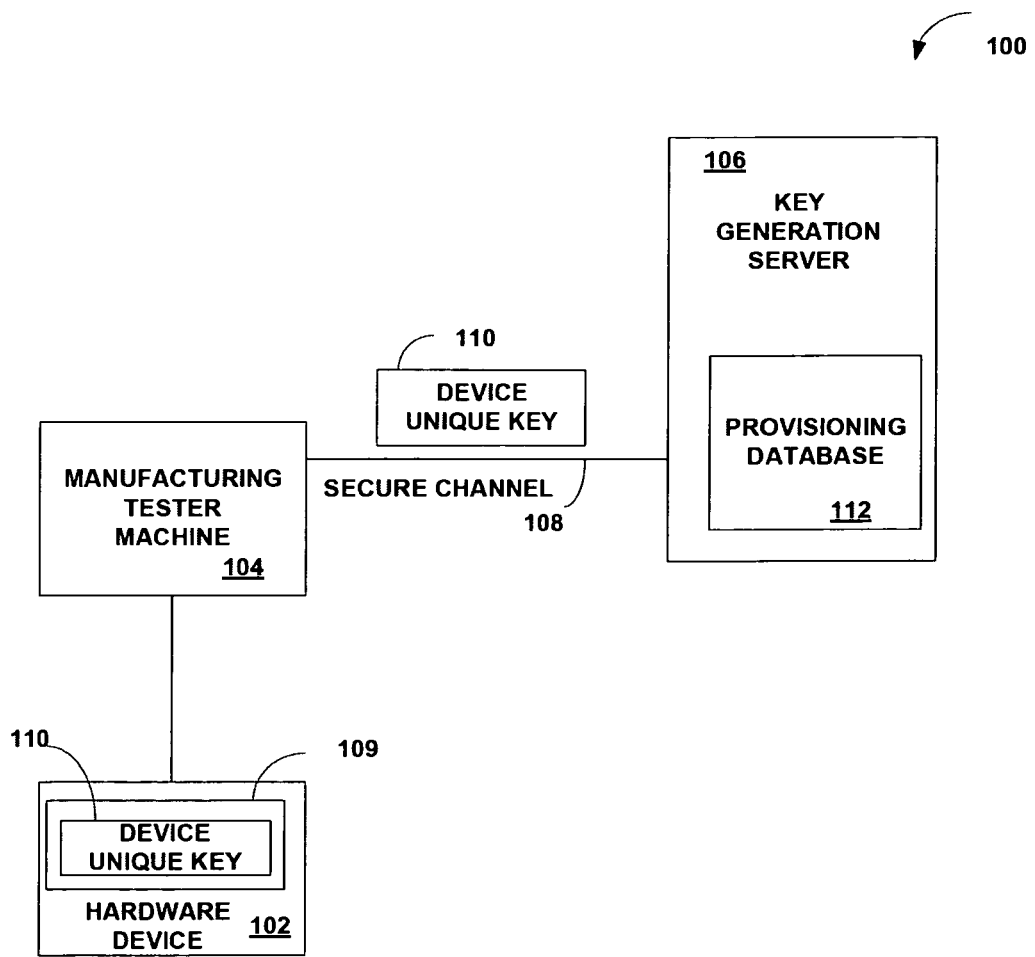
FIG. 1 is a block diagram illustrating a system for performing the initial key provisioning in a manufacturing environment.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

One method to provision keys used for providing security in a platform is for a manufacturer of a hardware device to permanently store the keys (key materials) in a programmable write once memory during the manufacturing of the hardware device. These keys may be stored in the hardware device prior to installing the hardware device in a platform. For example, the write-once memory may be a plurality of fuses in a secure area of the hardware device that cannot be accessed by firmware or software.

However, because all of the key materials are stored in write once memory the device manufacturer can only provision key materials to the hardware devices during the manufacturing process. In addition, if there are a large number of keys to be provisioned securely to a hardware device, a corresponding large area of write once memory is required which can be expensive to add to the platform.

Another method to provision key materials is for the device manufacturer to store a unique asymmetric Device Authentication Key (DAK) in write-once memory during the manufacturing process. Later, a provisioning server can provision keys (transmit keys) remotely to the hardware device installed in a platform using an interactive provisioning protocol. After validating the stored DAK received from the hardware device, the provisioning server sends the key materials to the hardware device. The disadvantages of this method include the size of the region of write-once memory used to store a unique DAK in the hardware device, the possibility of security breach via a manufacturing tester machine that stores the keys in write-once memory, no support for off-line provisioning (that is, when no Internet connection is available to the platform in which the hardware device is installed), and the use of asymmetric key operations which requires more memory for a larger Trusted Computing Base (TCB) size in the hardware device.

In an embodiment of the present invention, a key provisioning method uses a symmetrical key and supports both online and offline provisioning. A symmetric key is shared and used by both the sender and receiver of a message to encrypt and decrypt the message. In addition, during manufacturing of the hardware device, a method of initial key provisioning that is secure against attacks is performed to store a device unique key 110 in the hardware device. A key provisioning server includes a provisioning database to store a unique provisioning key for each hardware device that is tested by a manufacturing tester machine. The provisioning key is used to support both offline and online provisioning.

FIG. 1 is a block diagram illustrating a system 100 for performing the initial key provisioning in a manufacturing environment. The system 100 includes a hardware device 102, a manufacturing tester machine 104 and a key generation server 106. The manufacturing tester machine 104 and the key generation server 106 communicate via a secure channel 108. A secure channel is an authenticated and encrypted communication channel between two entities. For example, using Transport Layer Security (TLS), a platform can set up a secure channel with a server to perform online banking.

During manufacturing, a device unique key 110 is assigned to the hardware device 102 by the key generation server 106 and stored in a protected memory 109 in the hardware device 102. This device unique key 110 is protected by the hardware and is never exposed later to software executing in a platform in which the hardware device 102 is later installed. The platform in which the hardware device 102 is installed may be any computing device, for example, a mobile phone or computer.

In an embodiment, the hardware device 102 can be a processor. The processor may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor. In another embodiment the hardware device 102 can be an integrated circuit to be coupled to a processor on a platform to control communications with Input/Output devices. The integrated circuit can be one of a plurality of integrated circuits in a chipset that are designed to work together. For example, an integrated circuit in the chipset can link the processor to high speed devices such as memory and graphics controllers and another integrated circuit in the chipset can link the processor to lower-speed peripherals accessed via a Peripheral Controller Interface (PCI), Universal Serial Bus (USB) or communications protocol such as Ethernet.

The key generation server 106 is an off-line server that generates key materials including the hardware device unique key 110 assigned to the hardware device 102 and other keys used by the platform, for example, keys that may be used by encryption/decryption algorithms such as Advanced Encryption Standard (AES). An off-line server is a secure facility for key generation that does not directly interact with external entities over the Internet. The key generation server 106 operates in a secure/protected environment. There are many different methods that can be used to perform the initial provisioning of the device unique key 110 to the hardware device 102. The method used is dependent on the security level of the manufacturing environment. Three of these methods will be described in conjunction with FIGS. 2-4 below.

Figure 2:
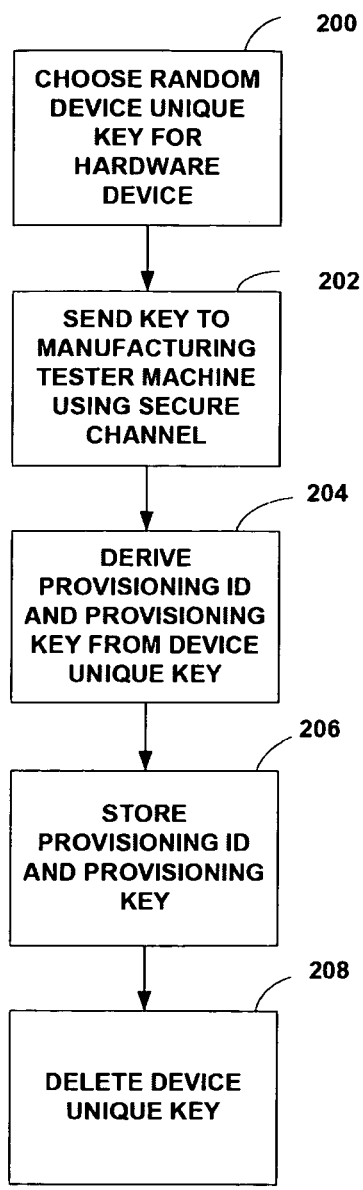
FIG. 2 is a flow graph illustrating a method for basic initial manufacturing provisioning of a device unique key 110 to the hardware device.

FIG. 2 is a flow graph illustrating a method for basic initial manufacturing provisioning of a device unique key to the hardware device.

At block 200, the key generation server 106 chooses a random device unique key for the hardware device 102 that is coupled to the manufacturing tester machine 104. Processing continues with block 202.

At block 202, the key generation server 106 sends the device unique key 110 for the hardware device 102 under test to the manufacturing tester machine 104 using a secure channel 108. Upon receiving the device unique key 110, the manufacturing tester machine 104 stores the device unique key 110 in a protected memory 109 which can be a write-once memory or a re-writable memory such as a Flash memory device in the hardware device 102. In an embodiment, the write-once memory comprises a plurality of fuses, and the unique key is stored by blowing fuses to permanently store the device unique key 110 in the device 102. Processing continues with block 204.

At block 204, the key generation server 106 derives a provisioning identifier and a provisioning key 804 for the hardware device 102 from the device unique key using different one-way functions. The provisioning key 804 and provisioning identifier will be described later. The use of a one-way function, allows the provisioning key 804 and the provisioning identifier to be derived from the device unique key 110 but the device unique key 110 cannot be derived from the provisioning key 804 or the provisioning identifier. In an embodiment, the one-way functions are pseudo random functions (PRF) used for key derivation, such as Hash-based Message Authentication Code (HMAC) and Advanced Encryption Standard-Cipher-based Message Authentication Code (AES-CMAC). The provisioning identifier and provisioning key 804 are unique to the hardware device 102. Processing continues with block 206.

At block 206, the key generation server 106 stores the provisioning identifier and the provisioning key derived from the device unique key 110 in a provisioning database 112 for use later in on-the-field key provisioning of other security keys to the hardware device 102. Processing continues with block 208.

At block 208, the key generation server 106 deletes the copy of the device unique key 110 stored in the key generation server 106 which was used to generate the provisioning key and provisioning identifier (ID) stored in the provisioning database 112.

Figure 3:
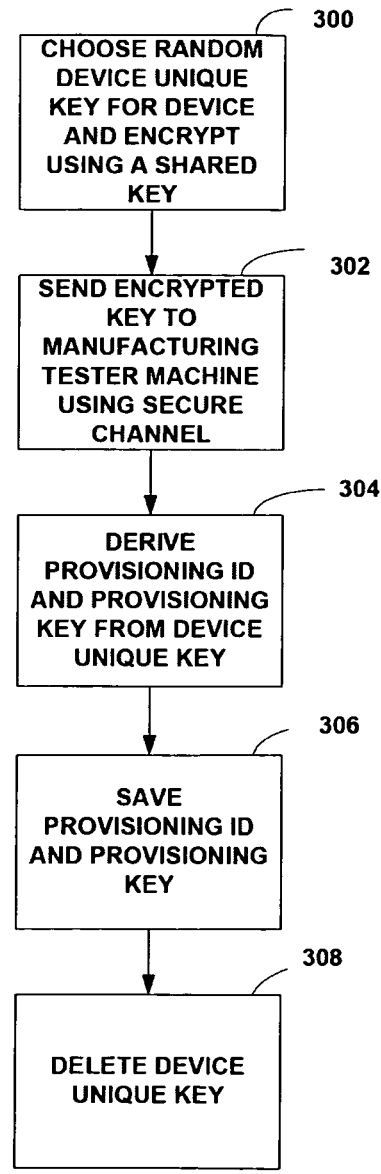
FIG. 3 is a flow graph illustrating a method for initial manufacturing provisioning of the device unique key 110 with shared key protection of a device unique key 110 to the hardware device.

FIG. 3 is a flow graph illustrating a method for initial manufacturing provisioning of the device unique key with a shared key protection to the hardware device. To enhance security, the key generation server 106 encrypts the device unique key 110 with a shared key that is embedded in each hardware device 102 such that only the hardware device 102 can decrypt the device unique key 110. The manufacturing tester machine 104 does not store or have access to the shared key. Thus, the manufacturing tester machine 104 cannot decrypt the device unique key 110 generated by the key generation server 106.

At block 300, the hardware device 102 to be tested has a symmetric shared key (SK) embedded in logic in the hardware device 102. The shared key is the same for a number of devices. The shared key is known to the hardware device 102 and the key generation server 106, but not known to the manufacturing tester machine 104. In an embodiment, the shared key is generated by the key generation server. The key generation server 106 chooses a random device unique key for each hardware device 102. The key generation server 106 encrypts the device unique key using the shared key which is known to the key generation server 106. The purpose of the shared key is two-folded: (1) add protection against malicious manufacturing tester, (2) add more protection to device unique key after the device 102 has been manufactured. Processing continues with block 302.

At block 302, the key generation server 106 sends an encrypted device unique key to the manufacturing tester machine 104 using the secure channel 108. The manufacturing tester machine 104 stores the encrypted device unique key in the protected memory 109 (for example, write-once memory (fuses)) in the hardware device 102. As the hardware device 102 stores the shared key used by the key generation server 106 to encrypt the device unique key, the hardware device 102 can access its stored encrypted device unique key and decrypt using the shared key to obtain the device unique key. Processing continues with block 304.

At block 304, the key generation server 106 derives a provisioning identifier and provisioning key from the device unique key as described earlier in conjunction with the embodiment shown in FIG. 2. Processing continues with block 306.

At block 306, the key generation server 106 deletes the device unique key 110 that it has generated and stores the provisioning identifier and provisioning key derived from the device unique key 110 in the provisioning database 112. At block 308, the key generation server 106 deletes the copy of the device unique key 110 stored in the key generation server 106.

Figure 4:
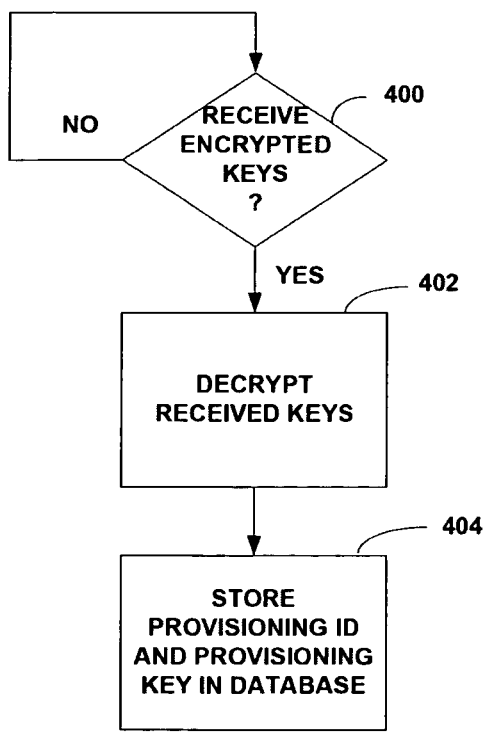
FIG. 4 is a flow graph illustrating a method for secure initial manufacturing provisioning of a device unique key 110 to the hardware device.

FIG. 4 is a flow graph illustrating a method for secure initial manufacturing provisioning of the device key to the hardware device. The method described in conjunction with FIG. 4 is more secure than the methods described in conjunction with FIGS. 2 and 3 because the device unique key is generated in the device and is not transmitted over a communications channel to any other hardware device 102. The hardware device 102 has a symmetric shared key (GK) embedded in logic. The GK is known to the hardware device 102 and the key generation server 106, but not known to the manufacturing tester machine 104. In addition to the GK discussed in the embodiment discussed in conjunction with FIG. 3, in this embodiment an asymmetric key pair, that is, a public encryption key (PEK) and private decryption key (PDK) are embedded in the hardware device 102. This asymmetric key pair is also stored in the key generation server 106.

The hardware device 102 generates a unique device key 110 using known methods which are beyond the scope of the present invention. For example, the unique device key 110 can be generated using a random gates technique or using physically unclonable functions (PUF) with fuzzy extractors. The hardware device 102 derives a provisioning identifier (ID) and a provisioning key from the device unique key 110, encrypts these two keys using PEK and computes a Message Authentication Code (MAC) of the two keys using the shared key. An example of functions used is shown below:

$C1=RSA\text{-}Enc(PEK,Provisioning\ ID\|Provisioning\ Key),$ $C2=MAC(GK,C1),$ $Ciphertext=C1\|C2.$ RSA-Enc(K, M) denotes RSA (Rivest, Shamir and Adleman) encryption of message M using an RSA public encryption key K. In an embodiment, the Message Authentication Code (MAC) function is HMAC. In another embodiment the MAC function is AES-CMAC. 5. The hardware device 102 outputs the ciphertext (encrypted keys) to the manufacturing tester machine 104.

At block 400, the key generation server 106 receives the ciphertext from the manufacturing tester machine 104 via a secure channel 108. Processing continues with block 402.

At block 402, the key generation server 106, verifies the MAC using GK, for each ciphertext, then decrypts using PDK. The key generation server 106 obtains the provisioning ID and provisioning key of the hardware device 102 securely via secure channel 108. In an embodiment, the key generation server 106 performs the following functions on the received ciphertext to obtain the provisioning identifier and provisioning key derived from the device unique key 110 stored in the hardware device 102.

$Verify\ C2=MAC(GK,C1)\ using\ GK,$ $Provisioning\ ID\|Provisioning\ Key=RSA\text{-}Dec(PDK,\ C1)\ using\ PDK,$ Processing continues with block 404.

At block 404, the key generation server 106 stores the provisioning identifier and provisioning key in a provisioning database 112.

After the hardware device 102 is manufactured, the hardware device 102 may be distributed to Outside Equipment Manufacturers (OEMs) and installed in platforms. Typically, the platforms are distributed to end users. There may be a need for the hardware device manufacturer to send (provision) a key to the end user of the platform that includes the hardware device 102. For example, the hardware device manufacturer can provision a unique key per hardware device 102, such as, a symmetric device authentication key, a Trusted Platform Module (TPM) endorsement key, a High-bandwidth Digital Content Protection (HDCP) key, or an Advanced Access Content System (AACS) device key or a common key to the hardware device 102.

In order to ensure that the hardware device manufacturer only provisions the key to a hardware device 102 that it has manufactured, prior to sending the key to the hardware device 102, the key is encrypted using the provisioning key associated with the hardware device 102 that was stored in the provisioning database 112. The device manufacturer can use this provisioning method multiple times to provision different keys to hardware devices 102 that it has manufactured.

The provisioning database 112 in the key generation server 106 stores a provisioning identifier and a provisioning key for each hardware device 102 that has been tested by the manufacturing tester machine 104. To provision a key for a hardware device 102 associated with a provisioning identifier and provisioning key, the key generation server 106 prepares the key material to be provisioned to the hardware device 102. The key material, also referred to as a "key blob" can be a single key, for example, a TPM key or a plurality of keys, for example, a TPM key and a HDCP key. Each hardware device 102 can be assigned different key material.

The key generation server 106 encrypts the key material using the provisioning key. The encryption is performed by a key wrapping (encryption) algorithm that can be any encryption algorithm, such as Advanced Encryption Standard-Galois/Counter Mode (AES-GCM) mode encryption or Advanced Encryption Standard-Cipher Block Chaining (AES-CBC) mode encryption combined with a pseudo random function (PRF). AES-GCM and AES-CBC are defined in NIST standard FIPS-197. The key generation server 106 prepares the provisioning database 112 to store all of the provisioning IDs and corresponding encrypted key(s).

Figure 5:
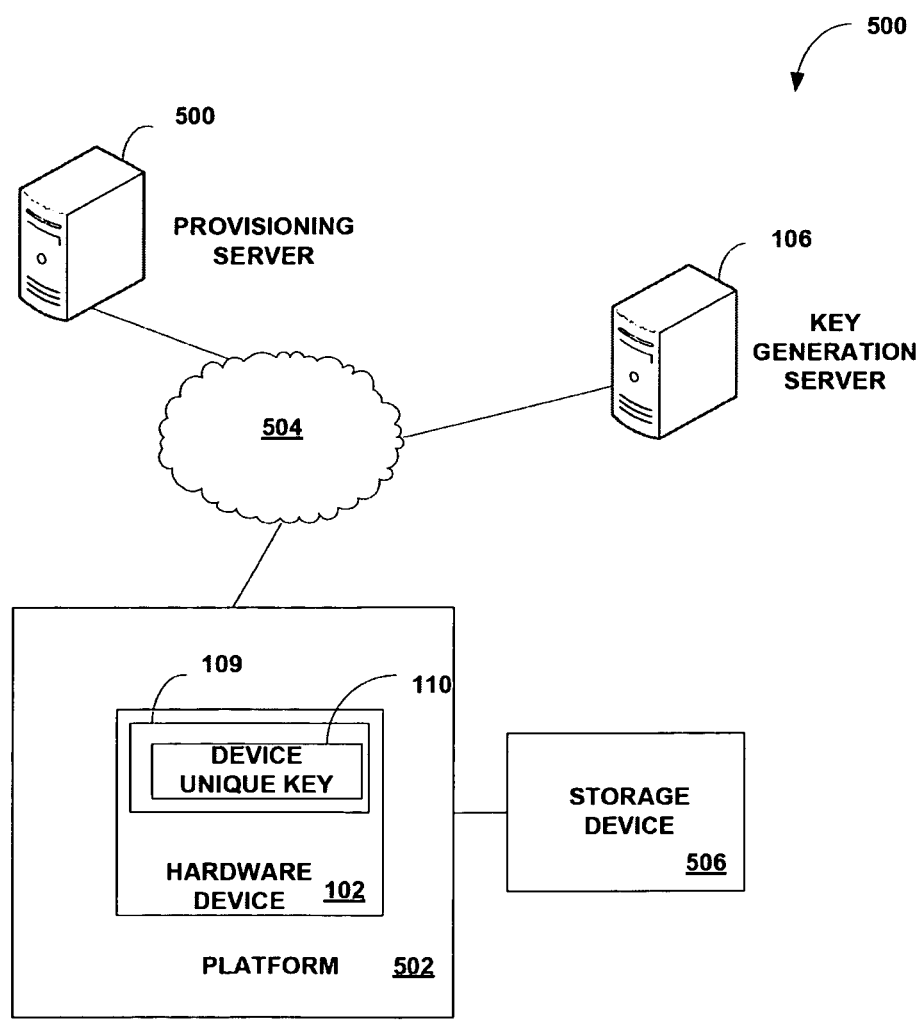
FIG. 5 illustrates a system that includes a key generation server, a provisioning server and a platform including the device coupled to a communications network.

FIG. 5 illustrates a system that includes a key generation server 106, a provisioning server 500 and a platform 502 including the hardware device 102 coupled to a communications network 504. In an embodiment, the system also includes a storage device 506 which may be a disk drive, for example, a Compact Disk (CD) or Digital Video Disk (DVD) with a removable storage medium (CD or DVD).

The key generation server 106 sends the contents of the provisioning database 112 to the provisioning server 500 so that the provisioning server 500 can perform on-line provisioning of keys via a communications network 504 to platforms 502 in which the hardware device 102 is installed. The provisioning database 112 can also be stored on a removable storage device, for example, a non-volatile memory device such as a Flash memory or a Compact Disk (CD) or Digital Video Disk (DVD) to perform off-line provisioning of the key to the hardware device 102.

When the hardware device 102 is installed in a platform (for example, a host system), and discovers that its keys have been revoked, the device issues a request to contact the provisioning server 500. In an embodiment, the request is sent from the hardware device 102 via a host network stack in the platform 502 over a secure communications channel to the provisioning server 500. As the secure channel is robust against man-in-the-middle attack, even if the host network stack is corrupted, the security of key provisioning is not affected because only firmware can access the provisioning ID and provisioning key.

Figure 6:
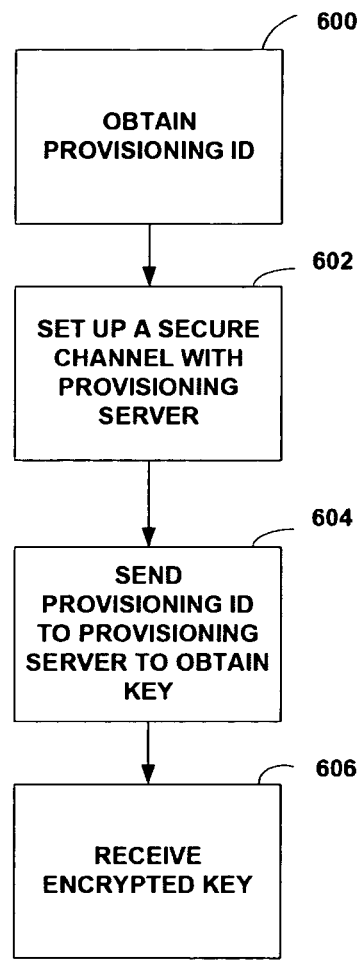
FIG. 6 illustrates an embodiment of an on-line method for a device to obtain a key from the provisioning server.

FIG. 6 illustrates an embodiment of an on-line method for a hardware device 102 to obtain a key from the provisioning server.

At block 600, the hardware device 102 in the platform obtains its device unique key stored in protected memory 109 in the hardware device 102, for example, in fuses or in random gates. If the hardware device unique key 110 is encrypted, the hardware device 102 decrypts it using the shared key (GK). The hardware device 102 derives the Provisioning ID from the device unique key using a pseudo random function as discussed earlier in conjunction with the key generation server 106. Processing continues with block 602.

At block 602, the hardware device 102 initiates a key exchange protocol with the provisioning server 500 to set up a secure channel. In an embodiment, the key exchange protocol is performed using a Secure Sockets Layer (SSL)/Transport Layer Security (TLS) session to verify that the provisioning server is authorized. In an embodiment in which revealing the provisioning ID over the communications network 504 does not pose a privacy concern, the security channel is not necessary and is not used. Processing continues with block 604.

At block 604, the hardware device 102 sends its Provisioning ID to the provisioning server 500 via the secure channel over the communication network, for example, the Internet. Processing continues with block 606.

At block 606, the provisioning server 500 receives the Provisioning ID from the provisioning database 112 and obtains the encrypted key associated with the provisioning ID stored in the provisioning data base. The hardware device 102 receives the encrypted key from the provisioning server 500 via the secure channel.

In some embodiments, the hardware device 102 may not have access to the communications network and requires a key to be provisioned in order to provide security functions in the hardware device 102. The key can be provisioned to the hardware device 102 off-line by distributing the provisioning database 112 on a removable storage device to the end user of the hardware device 102. The end user receives the entire provisioning database on the removable storage device but can only use the key(s) in the provisioning database that are encrypted by the hardware device's Provisioning key that is derived from the unique device key.

For off-line provisioning, the hardware device 102 obtains its provisioning ID using the method discussed for on-line provisioning. However, instead of sending its provisioning ID via the communications network, the hardware device 102 searches the local provisioning database for the encrypted key(s) associated with its provisioning ID.

Figure 7:
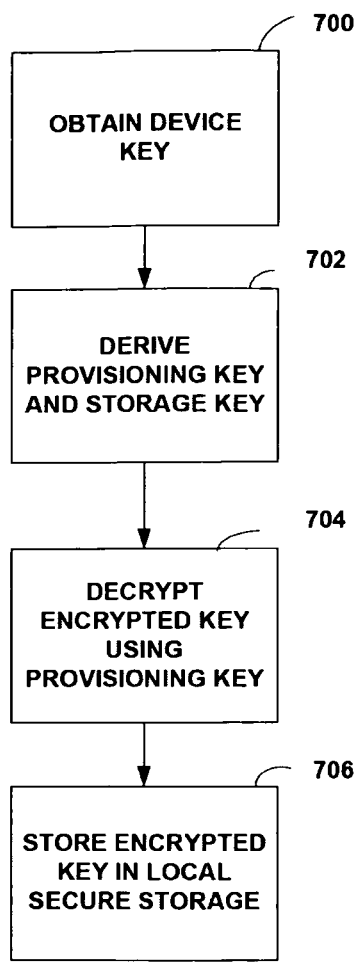
FIG. 7 illustrates a method for decrypting the encrypted key(s) implemented in the device.

FIG. 7 illustrates a method implemented in the hardware device 102 for decrypting the encrypted key(s). The method shown in FIG. 7 applies to an encrypted key provisioned using either on-line or off-line provisioning.

At block 700, the hardware device 102 obtains it device unique key 110 stored in the hardware device 102. Processing continues with block 702.

At block 702, the hardware device 102 derives the Provisioning Key and a Storage Key from the device unique key 110 using one-way pseudo random functions (PRF). The derived Storage key can be used to seal arbitrary secrets of the platform. The derived Provisioning key is used for provisioning. Processing continues with block 704.

At block 704, the hardware device 102 uses the derived provisioning key to decrypt the encrypted key(s) obtained using the online or offline key provisioning method discussed in conjunction with FIG. 6. Processing continues with block 706.

At block 706, the hardware device 102 stores the encrypted key(s) locally in its secure storage. In another embodiment, the encrypted key(s) can be encrypted again using the storage key and a pseudo-random function, the result of this additional encryption can be stored locally in secure storage instead of the received encrypted key(s).

A hardware device 102 can successfully remotely obtain key materials (encrypted keys) from the manufacturer of the hardware device 102 because it can derive the provisioning key used to encrypt the key materials. An attacker (for example, malware) cannot get the key materials from the hardware device manufacturer without the device unique key 110 from which the provisioning key is derived using a pseudo random function. The attacker may have access to the Provisioning database via the removable storage device, but the attacker cannot decrypt the encrypted keys without a valid Provisioning Key. In an embodiment that uses the shared key discussed in conjunction with FIG. 3, if the manufacturing tester machine 104 is corrupted, the attacker cannot get the encrypted key(s) from the manufacture because all the device unique keys are encrypted by the shared key which is unknown to the manufacturing tester machine 104. In the embodiment discussed in conjunction with FIG. 4, even if the manufacturing tester machine 104 has knowledge of the shared key, it is unable to learn the device unique key or Provisioning Key.

A small write-once memory is used to store a device unique key as a root of trust for the hardware device 102 which is used to derive other keys used to protect the hardware device 102 against malicious attackers. In one embodiment, the write-once memory is 128-bits. In another embodiment, the write-once memory is 256-bits. In other embodiments, the write-once memory is 128-bits or 192-bits or another size that is dependent on the length of the key used by symmetric encryption. The method for storing keys in the hardware device 102 during the manufacturing process is robust against a malicious manufacturing tester machine 104 which is important when device manufacturing is outsourced to other entities. In a platform that includes at least processor and a chipset having one or more integrated circuits, each integrated circuit in the chipset and processor can include a security engine with a device unique key. The provisioning of keys is simple and scalable and because of the use of symmetric key operations, the size of the Trusted Computing Base (TCB) is reduced.

A trusted platform typically has a Device Authentication Key (DAK) for attesting to the configuration of an execution environment or for platform authentication. The DAK can be provisioned to the trusted platform using the on-line or off-line provisioning methods described in conjunction with FIGS. 6-7. A trusted platform may also have a storage root key (SRK) used for encrypting platform keys and secrets. In an embodiment, the DAK can be a Direct Anonymous Attestation (DAA) key or any other type of digital signing key.

Direct Anonymous Attestation (DAA) is a cryptographic protocol for providing anonymous signatures. DAA is designed specifically for the Trusted Platform Module (TPM). DAA enables the remote authentication of a trusted platform while preserving the privacy of the user of the trusted platform.

If a vulnerability in the Trusted Computing Base (TCB) of the platform is found, for example, based on a malicious attack (software virus) on the platform, the vulnerability may be patched by installing another version of firmware in the platform. However, the platform cannot cryptographically prove that the vulnerability in the firmware has been corrected to others, for example, external entities.

Figure 8:
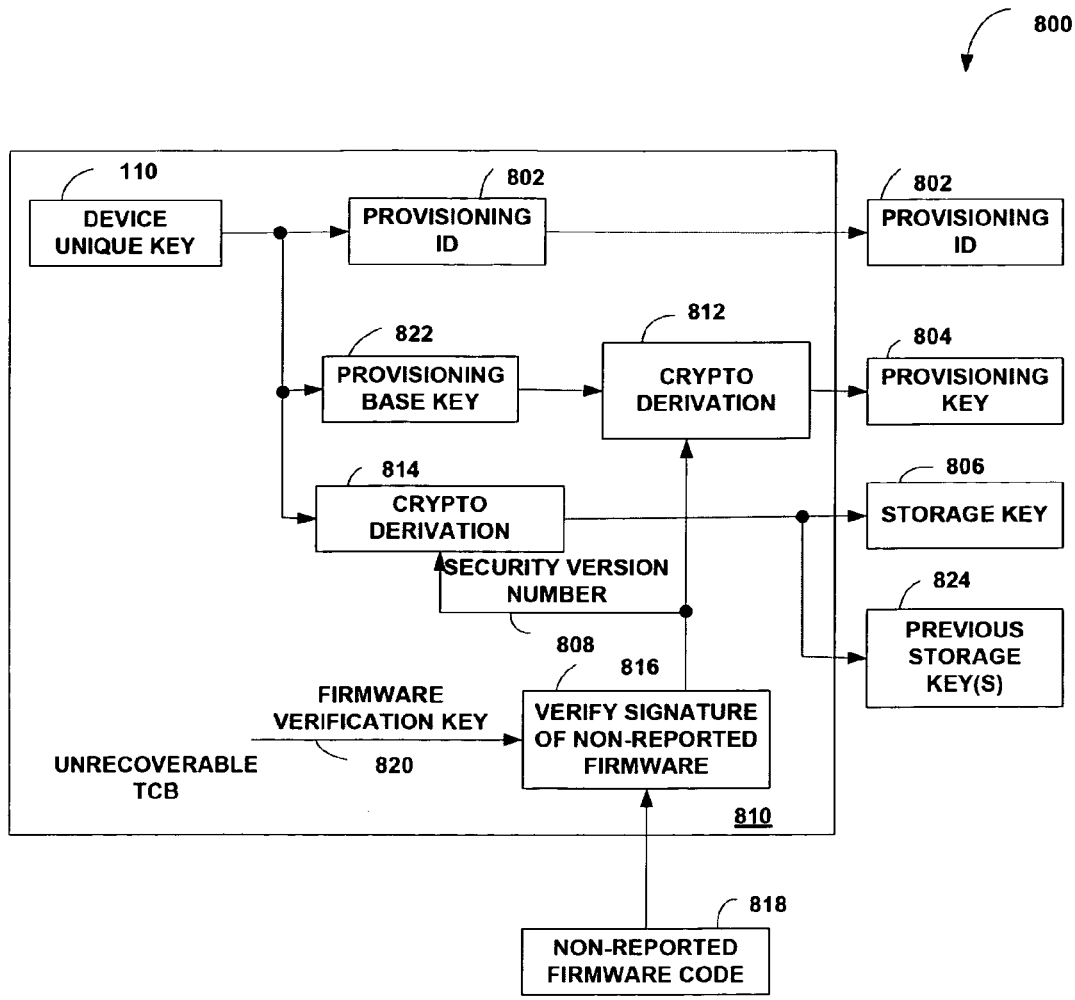
FIG. 8 is a block diagram of an embodiment of a Trusted Computing Base (TCB) of a trusted platform.

FIG. 8 is a block diagram of an embodiment of a Trusted Computing Base (TCB) 800 of a trusted platform. As can be seen from FIG. 8, TCB 800 includes unrecoverable TCB 810, which further includes crypto derivation modules 812 and 814. The unrecoverable TCB 810 also includes a module 816 that verifies signature of non-reported firmware. The modules 812, 814, and 816 can be implemented using known means and thus will not be described in more details below.

In the key hierarchy of a Trusted Computing Base 800, there is a device unique key 110 embedded in a hardware device 102 in a platform 502. The device unique key 110 is permanently stored in a protected storage 109 in the hardware device 102. This device unique key 110 is the "root key" for other keys in the platform, that is, several other keys in the Trusted Computing Base 800 are derived from this device unique key 110, such as, a provisioning ID 802, a provisioning base key 822, a provisioning key 804 and a storage key 806.

The provisioning ID 802 and provisioning key 804 are used to download a unique DAK key from a key provisioning server 500. The storage key 806 is used for encrypting keys and secrets of the platform 502 including the DAK key.

The upgraded firmware in the TCB 802 needs to access these derived keys, for example, provisioning ID 802, provisioning key 804, and storage key 806 to be functional. A unique identifier is assigned to identify different versions of the firmware. In one embodiment, the unique identifier is a Security Version Number (SVN) 808 that can be stored in non-reportable firmware code 818 in non-volatile memory and read by the unrecoverable TCB 810. In other embodiments, instead of assigning a unique identifier to identify different versions of the firmware, the unique identifier for each firmware version can be derived by performing a cryptographic function on each version of the firmware image.

The keys that are derived from the device unique key 110, that is, the provisioning ID 802, provisioning key 804, and storage key 806 are computed inside a signature verification portion of the TCB 810, which is designated to be non-recoverable and can also be referred to as the "unrecoverable TCB". The provisioning key 804 and storage key 806 are derived based on the Security Version Number 808, then output from the signature verification portion of the TCB 810 to a recoverable portion of the TCB 800. After the keys have been derived from the device unique key 110, the signature verification portion of the TCB 810 "locks" access to the device unique key 110, preventing recoverable portions of the TCB 800 from accessing the device unique key 110, that is, the raw "root key". As the provisioning key 804 and storage key 806 are stored in the recoverable portions of the TCB, the Provisioning key 804 and Storage key 806 are updated when there is an update to the SVN 808 of the TCB 800. For example, the key derivations are performed inside the recoverable TCB 810 during device boot. Each time new firmware is installed in the platform, a device re-boot is performed which results in a new provisioning key and storage key that are computed during the device re-boot.

Figure 9:
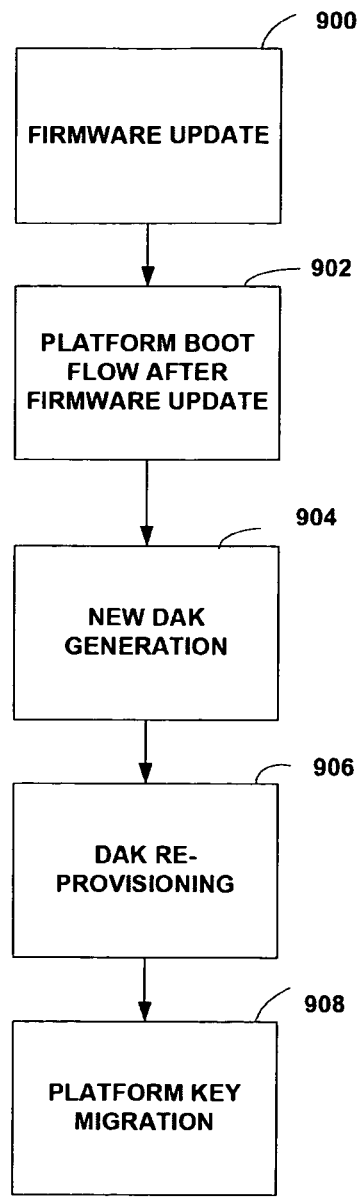
FIG. 9 is a flowgraph illustrating a method to recover from a security vulnerability in the TCB shown in FIG. 8.

FIG. 9 is a flowgraph illustrating a method to recover from a security vulnerability in a TCB 800. If security vulnerability has been discovered in the recoverable TCB, a TCB recovery event is triggered.

At block 900, when a security vulnerability is found in the TCB 800, the platform/hardware manufacturer generates a new version of the firmware that includes a software modification to fix the vulnerability. The new version of the firmware is assigned a security version number 808. To verify that the firmware is not malware but is from the platform/hardware manufacturer, the new version of the firmware is digitally signed (encrypted) by the hardware manufacturer. The unrecoverable TCB 810 can verify the signature using the manufacturer's public key, that is, the firmware verification key embedded in the hardware device 102 and make sure that the new firmware image was received from the hardware manufacturer and is not malware. The manufacturer distributes the new firmware to each platform using known methods, for example, via a firmware update from an Original Equipment Manufacturer (OEM), or a software update from a software manufacturer. Processing continues with block 902.

At block 902, after the new version of the firmware is installed on the platform, the signature verification portion of the TCB 800 verifies the signature of the new firmware for the recoverable TCB using the firmware verification key 820 embedded in the hardware device 102 in the platform. The signature verification portion of the TCB 810 retrieves the Security Version Number (SVN) 808 of the new firmware embedded in the firmware and retrieves the device unique key 110 stored in the hardware device 102. The provisioning ID 802 and Provisioning Base Key 822 are derived from the device unique key 110. The Provisioning key 804 is derived from the Provisioning Base Key 822 and the SVN 808. The Storage Key 806 is derived from the device unique key 110 and the SVN 808. Methods for deriving these keys will be described later. The derived provisioning ID 802, provisioning key 804, and storage key 806 are sent to the recoverable TCB. Processing continues with block 804.

At block 906, a new DAK is generated for the new version of firmware. After a TCB recover event has been triggered, the hardware manufacturer re-provisions a Device Authentication Key (DAK) to each platform 502 that received the new version of the firmware to fix the security vulnerability. The key generation server 106 generates the DAKs and sends to the respective platforms 502 via the communications network 504. As discussed earlier, the provisioning database 112 in the key generation server 106 stores a provisioning ID 802 and a Provisioning Base Key 822 for each hardware device 102 that was tested by the manufacturing tester device. A provisioning key 804 is derived from the stored provisioning base key 822 based on the latest Security Version Number 808. In an embodiment, the key derivation method selected is the same as used in block 904. The new unique DAK is generated for the hardware device 102 and encrypted using the provisioning key 804. Any symmetric encryption algorithm can be used, for example, AES-GCM. The key generation server 106 prepares a DAK provisioning database in which each database entry has a provisioning key 804 and the corresponding encrypted DAK. The key generation server 106 sends the DAK provisioning database to the key provisioning server 500. Each platform downloads a new DAK from the key provisioning server 500.

The recoverable TCB has the provisioning ID 802 and provisioning key 804 and communicates with the provisioning server 500 using a provisioning protocol to obtain the new DAK key for the platform 502. The platform 502 encrypts its provisioning ID 802 using the provisioning server 500's public key and sends the encrypted provisioning ID to the provisioning server 500. The provisioning server 500 decrypts the received encrypted provisioning ID using its private key to obtain the unencrypted provisioning ID 802 of the requesting platform 502. The provisioning server 500 searches the DAK provisioning database for an entry corresponding to the provisioning ID 802 that stores the encrypted new DAK key which is encrypted by the new provisioning key for the hardware device 102 in the platform 502. The provisioning server 500 sends the encrypted new DAK to the platform 502. The platform 502 decrypts the new DAK using the new provisioning key. The platform 502 re-encrypts the new DAK using its new storage key 806 and stores the encrypted new DAK securely. The encrypted new DAK is stored in non-volatile memory in the platform 502. The non-volatile memory can be BIOS flash memory, chipset flash memory, a solid state drive or hard disk drive. As the DAK is encrypted by the storage key, even if the non-volatile memory is accessed by an attacker, the attacker is unable to decrypt the DAK.

If the platform 502 has not installed the new firmware to fix the security vulnerability, it cannot derive the new provisioning key 804 corresponding to the latest SVN. Thus, the platform 502 cannot decrypt the new DAK; even it receives the encrypted new DAK from the provisioning server 500. Processing continues with block 908.

At block 908, after the platform 502 has installed the new firmware with a new SVN, it also has a new storage key 806 corresponding to the new SVN. Before the firmware upgrade, the platform 502 may have encrypted the platform key materials and secrets using an old storage key 806 corresponding to an old SVN. Thus, the platform 502 performs key migration, that is, re-encrypts all the platform key materials using the new storage key. For each data item (key materials or secrets) that is encrypted by the old storage key, the platform 502 decrypts using the old storage key and verifies the integrity of the unencrypted data. The platform 502 then re-encrypts the data using the new storage key and stores the encrypted data in non-volatile memory in the platform. As discussed earlier, the non-volatile memory is memory other than the TCB.

A new storage key is derived because if an attacker has corrupted the old version of the TCB firmware and extracted the storage key 806 associated with the old version, the attacker can still decrypt the platform secrets (including the new DAK) even after the firmware update.

If software vulnerability has been discovered in the current recoverable TCB, recovery is possible by updating the recoverable TCB firmware that fixes the vulnerability and assigning a new SVN 808. The old version of TCB cannot access or derive the new provisioning key 804 or the new storage key 806, which is used for downloading and wrapping (encrypting) a new DAK key, respectively because these keys are derived using the new SVN 808. In addition, the manufacturer of the platform 502 may revoke the DAKs associated with the previous TCB version. Each platform 502, after downloading new DAK, can use its new DAK to attest and cryptographically prove which version of the TCB 800 is being used.

If the recoverable TCB has not been upgraded with new firmware that fixes the vulnerability, the recoverable TCB cannot obtain a provisioning key 804 for the latest SVN, thus it cannot get the current version of the DAK key. Also, if the recoverable TCB gets access to previous storage Keys 824 for the key migration purpose and the recoverable TCB has been upgraded to a new SVN, the new recoverable TCB can decrypt the keys and data from the previous version and encrypt them using the new storage key.

Methods to perform key derivation to compute prior storage keys will be described below. In an embodiment, the initial value assigned to the SVN is 1 and for each new firmware update the SVN increments by one. SK[i] denotes the Storage Key corresponding to SVN i. The Provisioning ID and provisioning key 804 are computed as shown below:

Provisioning ID=PRF(device unique key,"Provisioning ID"),

Provisioning Base Key=PRF(device unique key,"Provisioning Base Key"),

Provisioning Key=PRF(Provisioning Base Key,"Provisioning Key"∥SVN).

In one embodiment, the unrecoverable TCB derives all of the previous Storage Keys 824 as follows:

For i=1, . . . ,SVN, compute SK[i]=PRF(device unique key,"Storage Key"∥i).

The unrecoverable TCB then sends all the Storage Keys to the recoverable TCB.

In another embodiment, only one prior storage key is computed. A platform 502 that controls storage of data protected by a storage key 806 may only require access to the current Storage Key and its prior Storage Key. The prior storage key is the storage key that was used by the platform 502 prior to the last firmware update.

Firmware can decrypt all existing data using the prior SVN and then re-encrypt the data using the current SVN, removing the need for any old SVN keys except during this transition. The unrecoverable TCB 810 outputs two Storage Keys, a first storage key 806 for the current SVN and a second storage key 824 for the prior SVN. As the user of the platform may skip some firmware upgrades, the prior SVN (pSVN) may not be SVN-1. The unrecoverable TCB 802 computes the following:

SK[SVN]=PRF(device unique key,"Storage Key"∥SVN).

SK[pSVN]=PRF(device unique key,"Storage Key"∥pSVN).

where: SVN is the current SVN; pSVN is the prior SVN and PRF is a pseudo random function.

The SVN 808 is available from the firmware of the TCB 800. The pSVN can be provided to the unrecoverable TCB 810 from the non-volatile memory in which it is stored. For example, in an implementation of a chipset TCB recovery implementation, the platform stores pSVN in the Flash Partition Table FPT partition of the Built In Operating System (BIOS). In an embodiment for a processor TCB recovery implementation, a previous storage key can be derived without using a pSVN.

Figure 10:
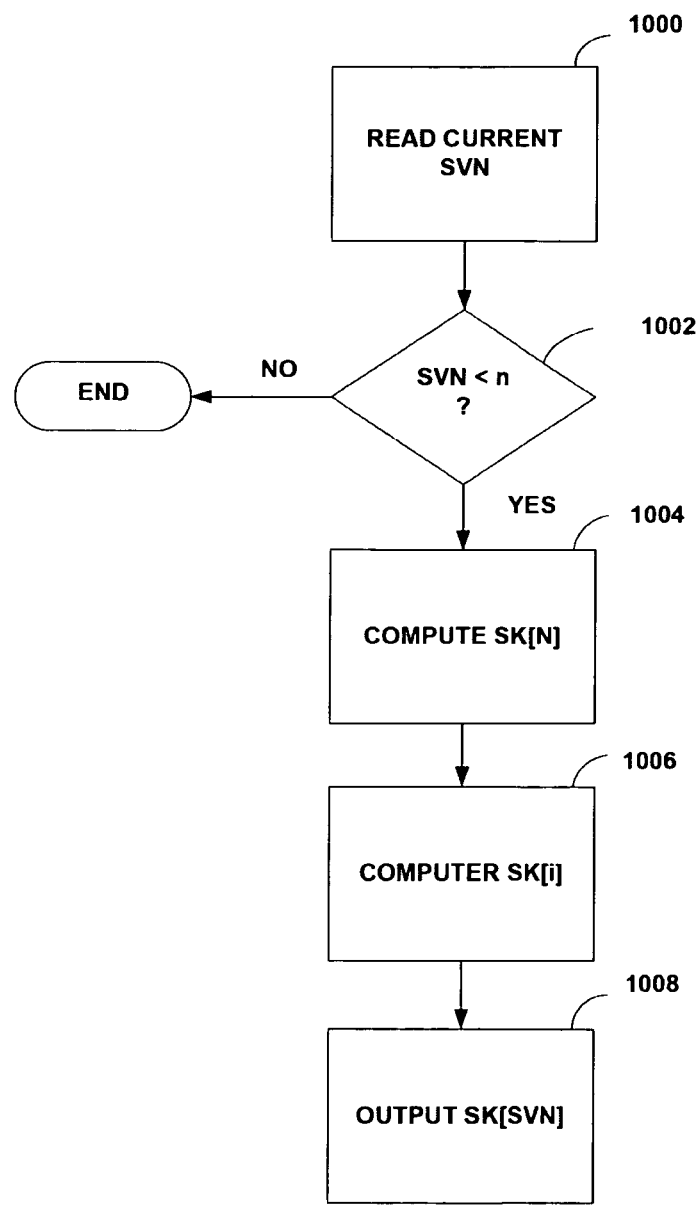
FIG. 10 is a flowgraph of an embodiment of a hash chain method to perform key derivation to compute prior storage keys.

FIG. 10 is a flowgraph of an embodiment of a hash chain method to perform key derivation to compute prior storage keys. In a platform 502 that does not have control over where protected data is stored, multiple prior storage keys 824 are needed to ensure proper access to previously protected data.

At block 1000, the current SVN 808 is read from the recoverable TCB firmware. Processing continues with block 1002.

At block 1002, there are a maximum number of recoverable prior SVNs ('n'). For example, in an embodiment, the maximum number of recoverable prior SVNs can be 32. If the current SVN is less than the maximum number of recoverable prior SVNs, processing continues with block 1004. If not, that is SVN is greater than n, the provisioning key and storage key cannot be derived and the TCB is no longer recoverable.

At block 1004, the value of the storage key corresponding to the maximum number of recoverable storage keys is computed as follows:

$$SK[n]=PRF(\text{device unique key},\text{"Storage Key"}\|n).$$

Processing continues with block 1006.

At block 1006, all of the storage keys up to the maximum number-1 are computed as follows:

$$SK[i]=Hash(SK[i+1]) \text{ for } i=1,\ldots,n-1.$$

Given SK[i], the storage keys for any previous firmware version can be derived by computing the hash function. However, given SK[i], future versions of storage keys cannot be derived without the device unique key 110. Processing continues with block 1008.

At block 1008, SK[SVN] is output.

The unrecoverable TCB 810 only needs to output a single storage key 806. However, the amount of computation to derive the storage key increases as maximum number of prior storage keys increases but if the maximum number of prior storage keys is small, the number of prior storage keys that can be recovered is reduced.

In yet another embodiment, some storage keys are directly derived from the device unique key 110, and other storage keys are computed from the hash of the next version. The value of the storage keys are defined as follows:

$$SK[i]=PRF(\text{device unique key},\text{"Storage Key"}\|i) \text{ if } i \text{ is a multiplier of } n,$$

$$SK[i]=Hash(SK[i+1]) \text{ if } i \text{ is not a multiplier of } n.$$

where n is a checkpoint integer.

Figure 11:
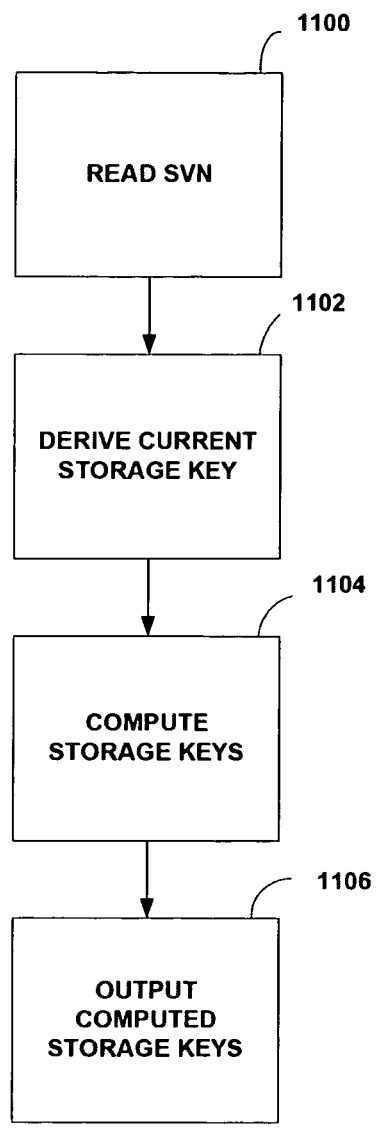
FIG. 11 is a flowgraph illustrating an embodiment of a method performed by the unrecoverable TCB to derive the Storage Keys.

FIG. 11 is a flowgraph illustrating an embodiment of a method performed by the unrecoverable TCB to derive the storage keys.

At block 1100, the SVN 808 is read from the unrecoverable TCB firmware. Processing continues with block 1102.

At block 1102, the current storage key is derived using the device unique key 110 as follows:

Let $m=[SVN/n]$;

$$SK[m\cdot n]=PRF(\text{device unique key},\text{"Storage Key"}\|m\cdot n);$$

For $i=m\cdot n-1,\ldots,SVN, SK[i]=Hash(SK[i+1])).$

Processing continues with block 1104.

At block 1104, the prior storage keys are computed using the current storage key as follows:

For $i=1,\ldots,m-1,$ Compute $SK[i\cdot n]=PRF(\text{device unique key},\text{"Storage Key"}\|i\cdot n).$ Processing continues with block 1106.

At block 1106, the compute storage keys, SK[SVN], SK[n], SK[2n], ..., SK[(m-1)-n] are output to the recoverable TCB. Given SK[SVN], SK[n], SK[2n], ..., SK[(m-1)-n], the recoverable TCB can compute any SK[i] for i=1, ..., SVN.

Embodiments of methods to compute previous storage keys 824 for a single recoverable TCB have been described. However, a platform can have multiple layers of recoverable TCBs. In an embodiment, each layer of TCB has its own SVN 808. Each layer has a derived key computed by the previous layer. If the security version number is an integer, each layer of TCB may need to verify the signature of the next layer TCB firmware. For example, in an embodiment, the unrecoverable TCB can be a firmware patch loader, the layer 1 TCB is firmware layer 1 and layer 2 TCB is the firmware implementation of a higher level technology.

Figure 12:
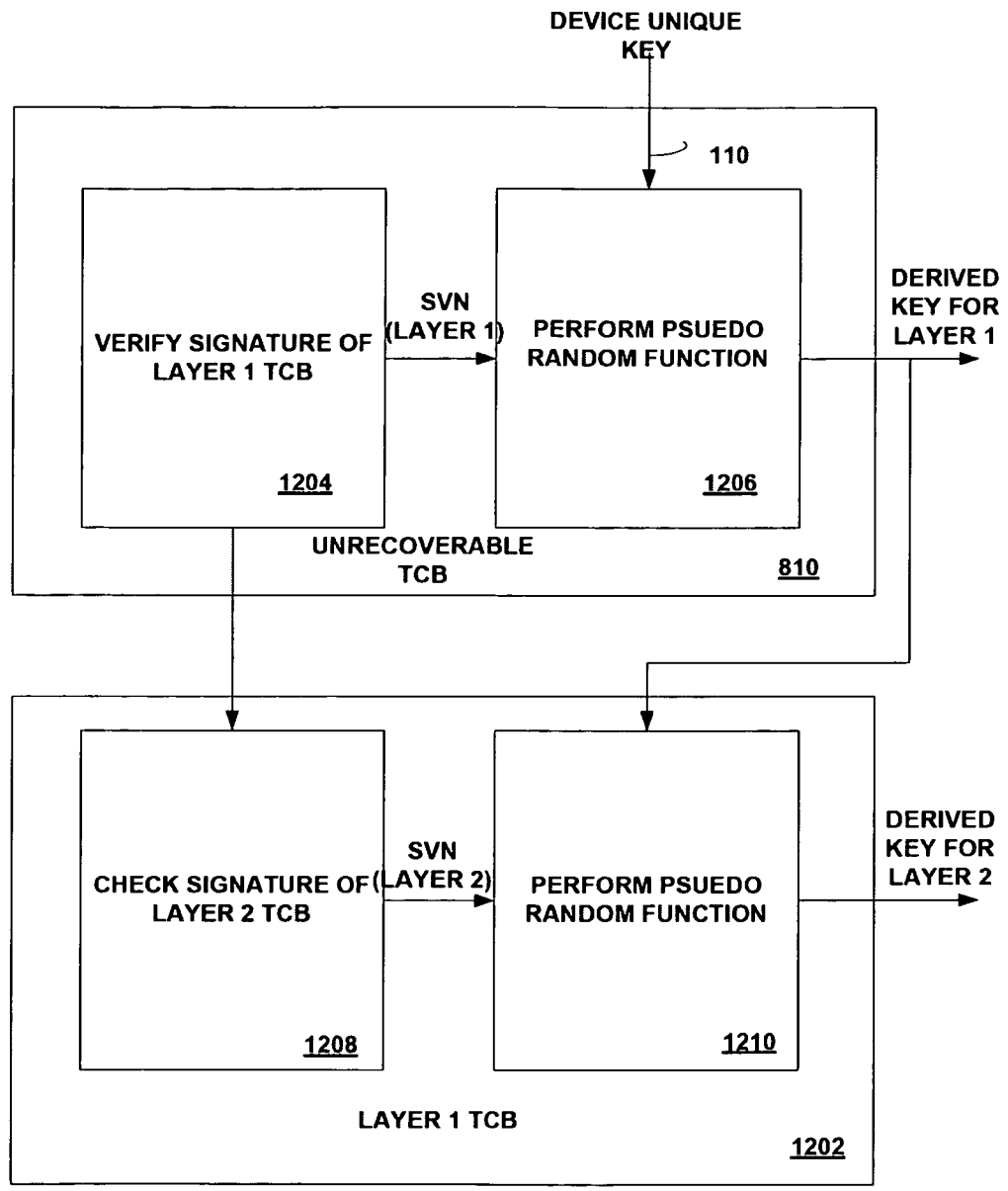
FIG. 12 is a block diagram of a two layer TCB.

FIG. 12 is a block diagram illustrating the unrecoverable TCB 810 and layer 1 TCB 1202. During a boot sequence, that is, each time the platform is powered on, the unrecoverable TCB 810 receives the device unique key 110.

At block 1204, the unrecoverable TCB 810 verifies the signature of unrecoverable TCB firmware and forwards unrecoverable TCB's SVN to block 1206. At block 1206, the unrecoverable TCB derives a key for Layer 1 TCB 1202 based on performing a pseudo random function on the received device unique key 110 and unrecoverableTCB's SVN.

In layer 1 TCB 1202 at block 1208, Layer 1 TCB 1202 checks the signature of Layer 1 TCB firmware. At block 1210, the Layer 1 TCB 1202 derives the key for Layer 2 TCB (not shown) based on performing a pseudo random function on the received derived unrecoverable TCB key and Layer 1 TCB's SVN in block 1210. To generate k keys, the key generation functions shown in blocks 1204, 1206, 1208 and 1210 are repeated k times.

In an embodiment discussed earlier, in which a current key and previous key are used, each level of a multi-layer TCB can produce two keys based on the SVN and pSVN of that layer. These two keys are derived from the SVN and pSVN keys of the previous layer.

The hash chain method discussed in conjunction with FIG. 10, provides single layer TCB recovery, however this does not scale to multiple layers.

If the platform contains an active recoverable layer, that can queried at run time, a hybrid approach uses the hash chain to protect a recoverable layer. The recoverable layer stores the remaining layer SVNs and can derive storage keys for any arbitrary combination of pSVN of different layers on demand.

Figure 13:
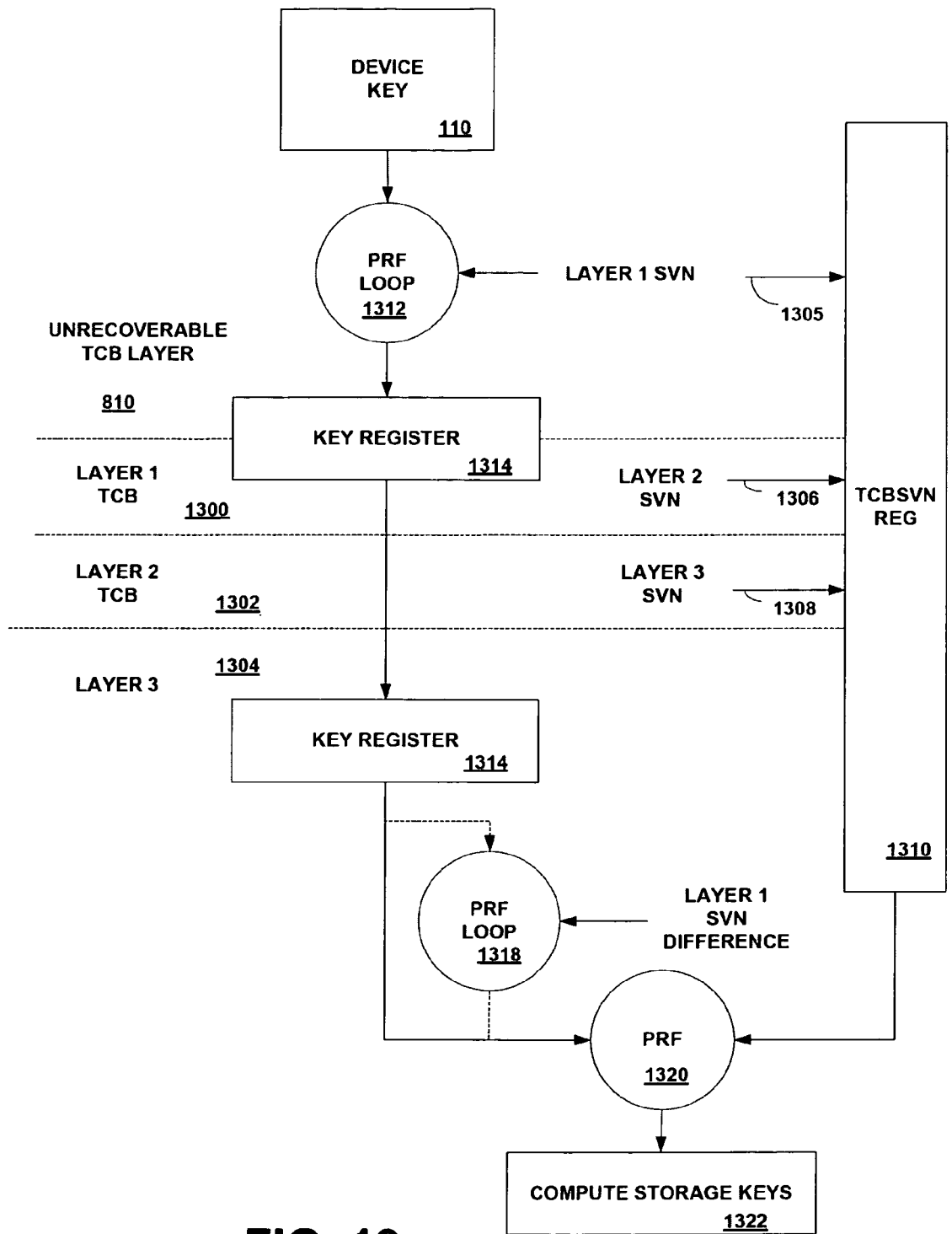
FIG. 13 is a block diagram illustrating a hybrid approach using a hash chain to protect a recoverable layer.

FIG. 13 is a block diagram illustrating a hybrid approach using a hash chain to protect a recoverable layer. Four layers are shown: an unrecoverable TCB layer 810, layer 1 TCB 1300, layer 2 TCB 1302 and layer 3 1304. All four layers shown will be implemented in an embodiment for a processor unit. Only two of the layers: an unrecoverable TCB layer 810 and layer 1 TCB 1300 are typically used in an embodiment for a chipset. The key register 1314 can be a special register in the processor unit or chipset that is used by the unrecoverable TCB layer 810 and by layer 3 1304 in an embodiment for a processor unit.

The TCB for each layer (i) is computed as follows:

$$TCB[i]=SVN \text{ of TCB layer } i.$$

The unrecoverable TCB layer 810 receives the stored device unique key 110, verifies the integrity and source of Layer 1 recoverable TCB firmware and calculates SK[TCB[1]] using hash chaining in the PRF loop 1312. The PRF loop 1312 derives a provisioning key for a particular layer for a particular revision of the key and stores the provisioning key for layer 1 CB 1300 in the key register. The PRF loop also generates the Layer 1 SVN 1305, Layer 2 SVN 1306 and Layer 3 SVN 1308. The PRF function performed in the PRF loop 1312 can be a hash function that is performed on the root key and the current TCB version (or a previous TCB version number).

Layer 1 TCB 1302 verifies the integrity and source of Layer 2 and stores Layer 2's Security Version Number (SVN) 1306 generated by PRF loop 1312 in a protected register, for example, in a TCBSVN Register 1310. The TCBSVN Register 1310 can be protected from being overwritten by the other layers.

Layer 2 through the last layer perform the same operations as discussed in conjunction with layer 1 1300. Instructions implemented in the last layer can call a layer 1 function getKey(TCB_request[ ]) which performs the following operations.

For $i=1,\ldots,$ TCB layer count

If TCB_request[i]>TCB[i], then return failure.
If TCB_request[i]<TCB[i] then
    tmp=SK[TCB_request[i]] using chaining
Return PRF(tmp, "Storage Key"||j||k);
    where j and k are SVNs for layer 1 TCB 1300 and layer 2 TCB 1302.

The storage key 806 for any previous permutation of TCB layers can be derived, if layer 1 remains active.

Layer 3 1304 also uses the provisioning key stored in the key register 1314 and performs an optional PRF function in PRF loop 1318 if required to generate a previous version of the provisioning key. A PRF function is performed at 1320 on either the stored provisioning key stored in the key register 1314 or derived in PRF loop 1318 with the stored layer 2 SVN 1306 and stored layer 3 SVN 1308. The storage keys are computed based on the result of this PRF function 1322.

A corrupted platform is prevented from receiving a new DAK from the provisioning server 500. Each platform can receive a new DAK if it has updated its recoverable TCB firmware. If a platform has been revoked, for example, the platform's device unique key 110 has been extracted during a malicious hardware attack, a DAK re-provisioning protocol does not provide a new DAK to the platform.

Figure 14:
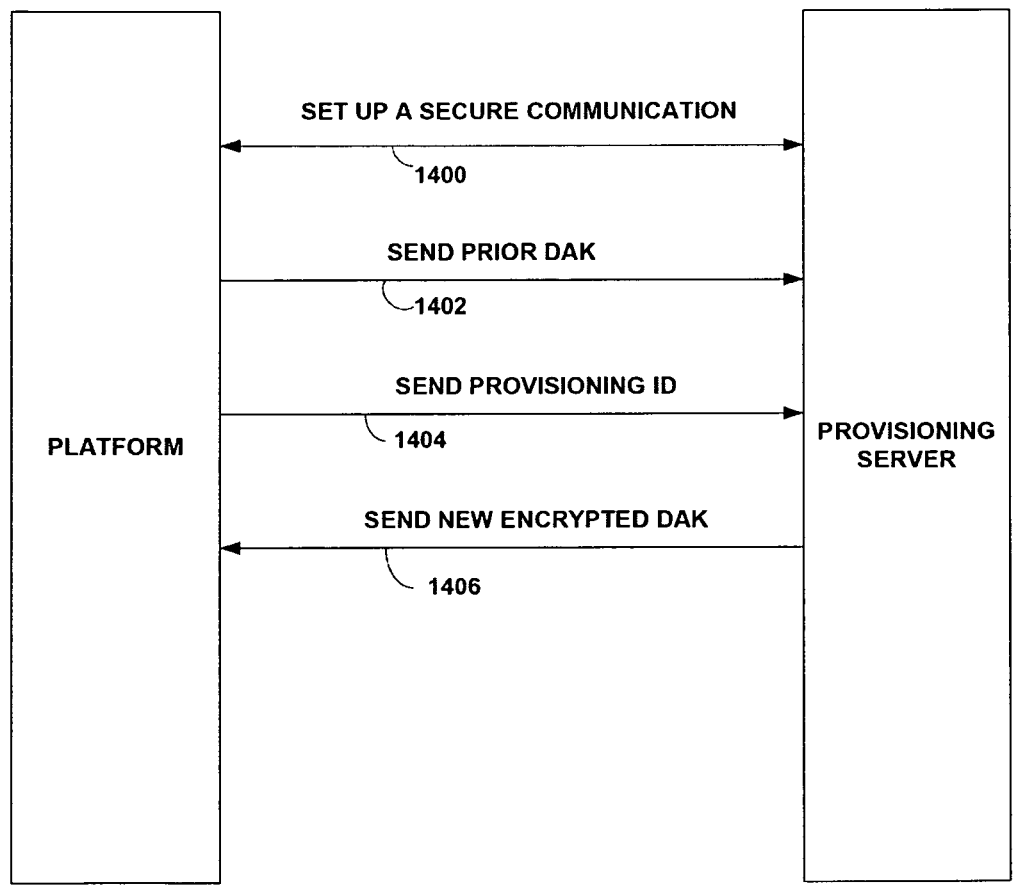
FIG. 14 illustrates an embodiment of a Device Authentication Key (DAK) provisioning protocol between a platform and a provisioning server.

FIG. 14 illustrates an embodiment of a DAK provisioning protocol between a platform 502 and a provisioning server 500.

At 1400, the platform 502 and the provisioning server 500 set up a secure communication channel using a standard protocol, such as TLS/SSL.

At 1402, the platform 502 encrypts a message using its previous DAK and sends the encrypted message to the provisioning server 500. The provisioning server 500 checks the previous DAK and performs a revocation check on the previous DAK to determine if it has been revoked. If the platform 502 has been revoked, the provisioning server 500 terminates the protocol.

At 1404, the Platform sends the Provisioning ID 802 over the secure channel to the provisioning server 500. The provisioning server 500 searches the DAK provisioning database using the received provisioning ID (one per hardware device 102) and retrieves the encrypted new DAK for the platform 502.

At 1406, the provisioning server 500 sends the new encrypted DAK to the platform 502.

In an embodiment in which there is a privacy requirement for the provisioning server 500 to delete the DAK after it has been provisioned to the platform 502, the DAK re-provisioning is modified to store the DAK in the provisioning server 500.

Figure 15:
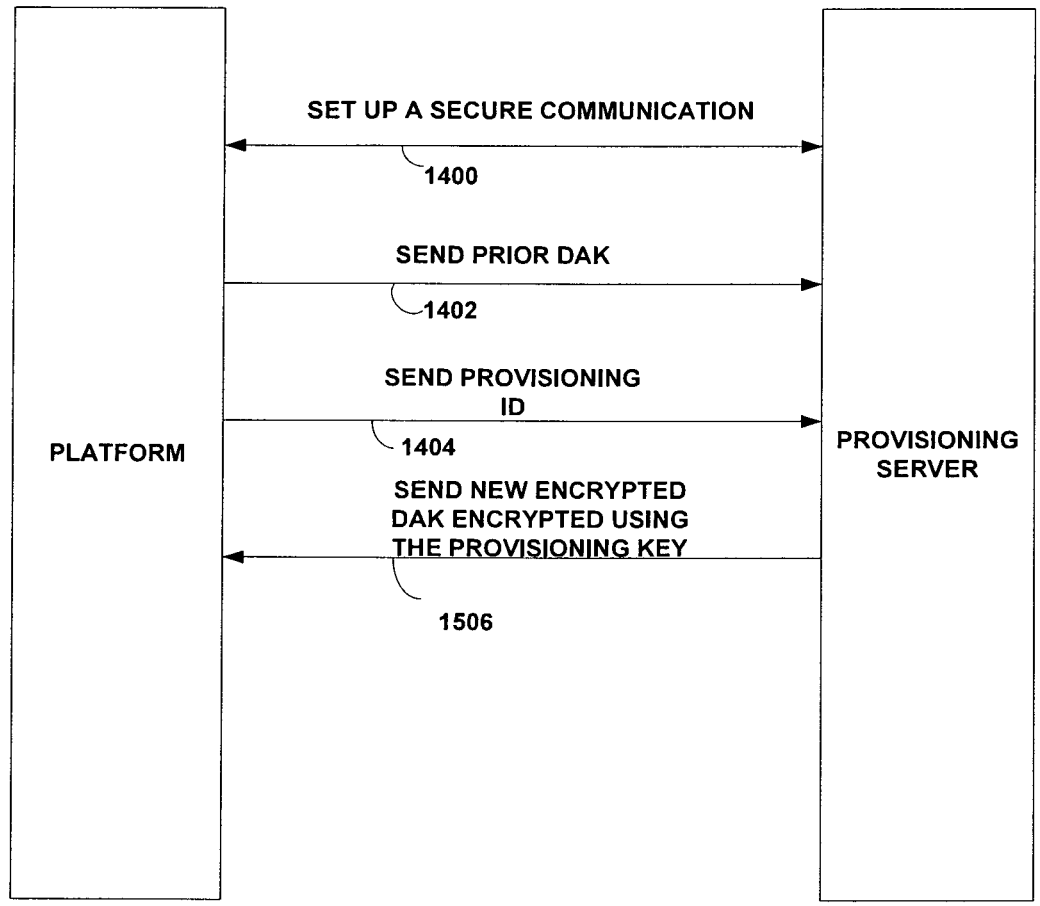
FIG. 15 illustrates an embodiment of the re-provisioning protocol in FIG. 14 between the platform and the provisioning server that supports privacy.

FIG. 15 illustrates an embodiment of the re-provisioning protocol in FIG. 14 between the platform 502 and the provisioning server 500 that supports privacy. As can be seen from FIG. 15, at 1506, the provisioning server sends new encrypted DAK encrypted using the provisioning key to the platform.

As discussed in conjunction with FIG. 14, at 1400, the platform 502 sets up a secure channel with the provisioning server 500.

At 1402, the platform 502 proves that it has not been revoked by sending its previous DAK to the provisioning server 500.

At 1404, the platform 502 sends the Provisioning ID over the secure channel to the provisioning server 500. The provisioning server 500 searches the DAK provisioning database for a match for the previous DAK and retrieves the new DAK for the platform 502.

At 1406, the provisioning server 500 sends the new DAK encrypted using the provisioning key 804 back to platform 502. The platform 502 decrypts the encrypted DAK using its provisioning key 804.

At 1408, the platform 502 re-encrypts the received new DAK using its storage key 806, which is unknown to the provisioning server 500 and key generation server 106. The platform 502 sends the new DAK encrypted by its storage key 806 to the provisioning server 500. The provisioning server 500 deletes the platform's DAK from its database and stores the new DAK encrypted by its storage key in the database.

Figure 16:
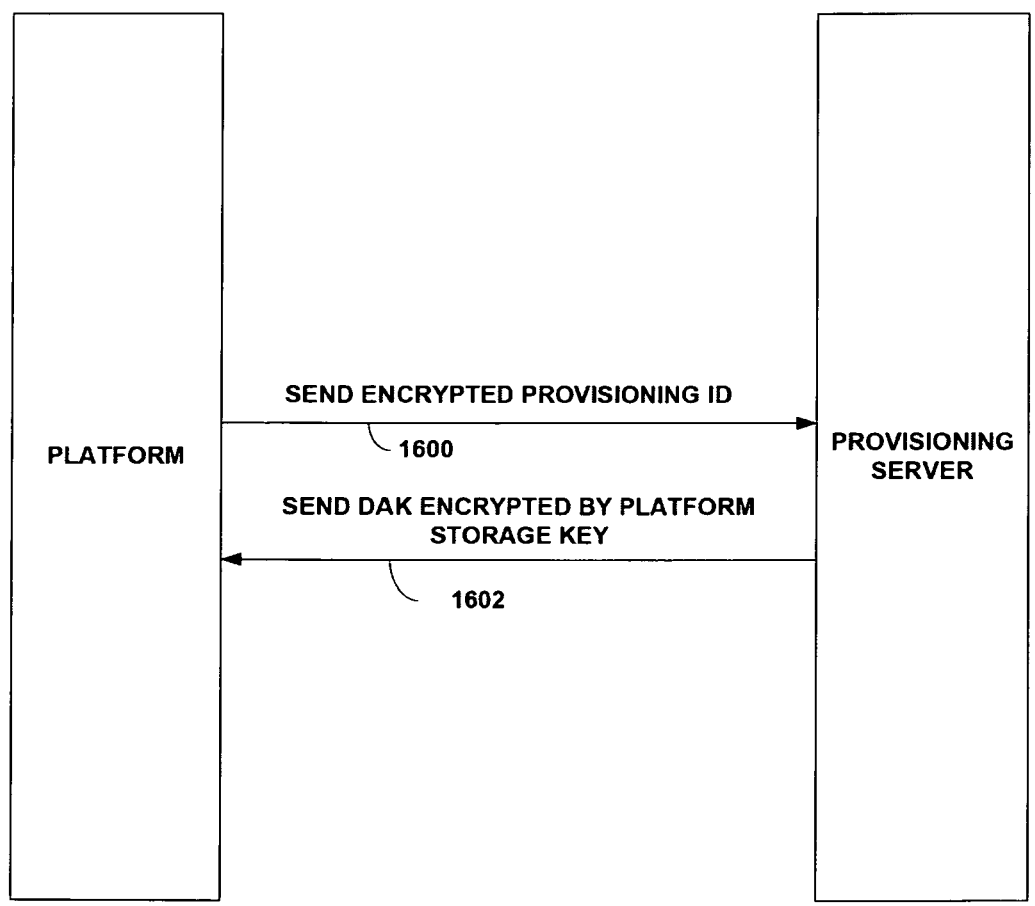
FIG. 16 illustrates an embodiment of a DAK backup retrieval protocol between the platform and the provisioning server that stores the platform's DAK encrypted by its storage key.

FIG. 16 illustrates an embodiment of a DAK backup retrieval protocol between the platform and the provisioning server 500 that stores the platform's DAK encrypted by its storage key.

If the platform loses its DAK, it can download the DAK stored in the database in the provisioning server 500.

At 1600, the platform 502 encrypts its provisioning ID 804 using the provisioning server's public key and sends the encrypted provisioning ID to the provisioning server 500. Upon receiving the encrypted provisioning ID, the provisioning server 500 decrypts the provisioning ID and searches for an entry corresponding to the provisioning ID in the provisioning server's database.

At 1602, the provisioning server 500 sends the DAK encrypted in by the platform's storage key 806 that is stored in the provisioning server 500's database to the platform. Upon receiving the encrypted DAK, the platform 502 uses its storage key to decrypt the received encrypted DAK (the backup copy of the DAK).

The Previous Security Version Number (PSVN) is stored in a non-volatile re-writable memory such as a Flash memory in the platform 502. A simple wear-out protection algorithm is used to store the PSVN persistently in the non-volatile re-writable memory with minimal flash file system support to avoid erase cycles in the non-volatile re-writable memory.

A 64-byte block (partition) in the non-volatile re-writable memory (for example, Flash memory) is used to store the Previous Security Version (PSVN). Each byte represents a potential PSVN, with only a single byte of the 64-byte block being valid at any time. The default value for a byte in the 64-byte block is 255 (0xFF in hexadecimal representation). If the value of the byte is 0 (0x00 in hexadecimal representation), the PSVN entry has already been used and is now invalid. Any other value (1 through 254 (0x01-0xFE in hexadecimal representation)) indicates that the PSVN entry is valid.

Figure 17:
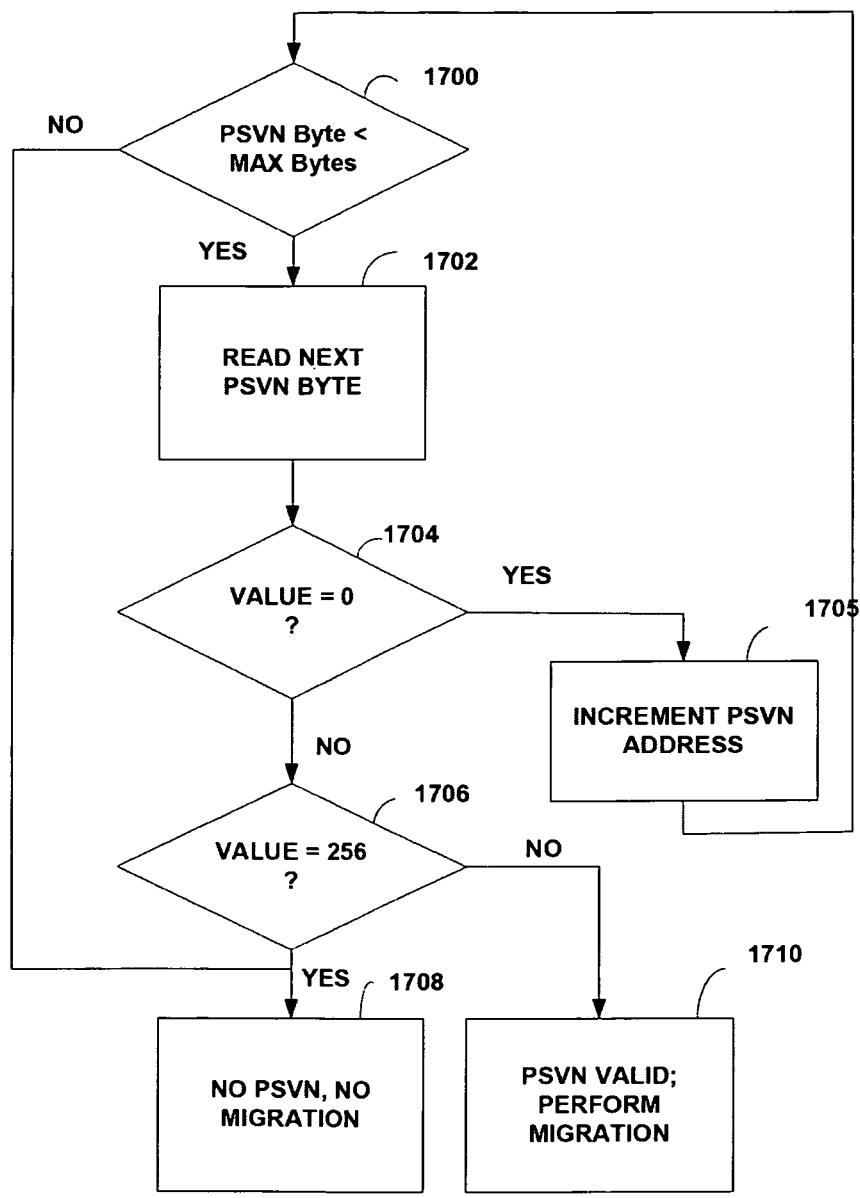
FIG. 17 is flowgraph of an embodiment of a method for storing a P-SVN in the non-volatile re-writable memory.

FIG. 17 is flowgraph of an embodiment of a method for storing a PSVN in the non-volatile re-writable memory.

At block 1700, if the current byte address is less than the maximum byte address in the 64-byte block, processing continues with block 1702.

At block 1702, the byte in the 64-byte block at the current address is read. Processing continues with block 1704.

At block 1704, if the value is zero, processing continues with block 1705. If not, processing continues with block 1706.

At block 1705, the address of the 64-byte block is incremented to read the next byte location. Processing continues with block 17000.

At block 1706, if the value is 255 there is no active PSVN. Processing continues with block 1708. If the value is not 255, the value is 1 through 254 and the PSVN is valid. Processing continues with block 1710.

At block 1710, the previous root key is derived.

At block 1708, the number of PSVN entries exceeds 64 (the number of locations available in the 64-byte block reserved for storing PSVN entries), no provisioning keys can be derived and the DAK keys cannot be re-keyed.

A method and apparatus has been described for a platform to prove the TCB has been patched by facilitating provisioning of a new DAK. This method and apparatus can be used by security applications such as, Manageability Engine (ME), and TPM.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

What is claimed is:

1. A method for provisioning a device unique key between a key generation server and a remote hardware device, comprising:
    generating, by the hardware device, the device unique key, wherein the hardware device stores an asymmetric public-private key pair which is also known to the key generation server;
    deriving, by the hardware device, a provisioning identifier (ID) and a provisioning key associated with the provisioning ID from the device unique key using one-way functions such that the device unique key cannot be derived from the provisioning ID or the provisioning key;
    encrypting, by the hardware device, the provisioning ID and provisioning key using the asymmetric public-private key pair;
    sending the encrypted provisioning ID and provisioning key to the key generation server;
    decrypting, by the key generation server, the encrypted provisioning ID and provisioning key using the asymmetric public-private key pair and storing the provisioning ID and provisioning key in a provisioning database associated with the key generation sever such that the hardware device is provisioned with the device unique key which is never transmitted outside the hardware device.

2. The method of claim 1, wherein the hardware device also stores a symmetric shared key which is also known to the key generation server, wherein the method further comprises:
    computing, by the hardware device, a message authentication code of the key pair using the shared key;
    sending, by the hardware device, the message authentication code to the key generation server;
    verifying, by the key generation server, the message authentication code using the shared key; and
    not decrypting the encrypted provisioning ID and provisioning key if message authentication code is verified not to be valid.

3. The method of claim 1, wherein the provisioning ID and provisioning key are derived from the device unique key using different one-way functions and are symmetrical keys.

4. The method of claim 3, wherein the one-way functions are pseudo random functions for key derivation that include Hash-based Message Authentication Code and Advanced Encryption Standard-Cipher-based Message Authentication Code.

5. The method of claim 1, wherein the device unique key is generated from a random number, wherein the method further comprises storing the device unique key in a protected memory of the hardware device.

6. The method of claim 1, wherein the device unique key is generated using physically unclonable functions with fuzzy extractors.

7. A key provisioning system to provision a device unique key in a hardware device, comprising:
    a key generation server that includes a provisioning database;
    a communication channel coupled to the key generation server;
    a manufacturing tester machine coupled to the hardware device and the key generation server via the communication channel, wherein the hardware device generates the device unique key, wherein the hardware device stores an asymmetric public-private key pair which is also known to the key generation server, wherein the hardware device derives a provisioning identifier (ID) and a provisioning key associated with the provisioning ID from the device unique key using one-way functions such that the device unique key cannot be derived from the provisioning ID or the provisioning key, wherein the hardware device encrypts the provisioning ID and provisioning key using the asymmetric public-private key pair, wherein the hardware device sends the encrypted provisioning ID and provisioning key to the key generation server via the tester machine and the communication channel, wherein the key generation server decrypts the encrypted provisioning ID and provisioning key using the asymmetric public-private key pair and stores the provisioning ID and provisioning key in the provisioning database in order to provision the hardware device with the device unique key which is never transmitted outside the hardware device.

8. The key provisioning system of claim 7, wherein the hardware device computes a message authentication code of the key pair using a symmetric shared key which is also known to the key generation server, sends the message authentication code to the key generation server, wherein the key generation server decrypts and verifies the message authentication code using the shared key, and does not decrypt the encrypted provisioning ID and provisioning key if message authentication code is verified not to be valid.

9. The key provisioning system of claim 7, wherein the provisioning ID and provisioning key are derived from the device unique key using different one-way functions and are symmetrical keys.

10. The key provisioning system of claim 9, wherein the one-way functions are pseudo random functions for key derivation that include Hash-based Message Authentication Code and Advanced Encryption Standard-Cipher-based Message Authentication Code.

\* \* \* \* \*